United States Patent Office 3,267,337
Patented August 16, 1966

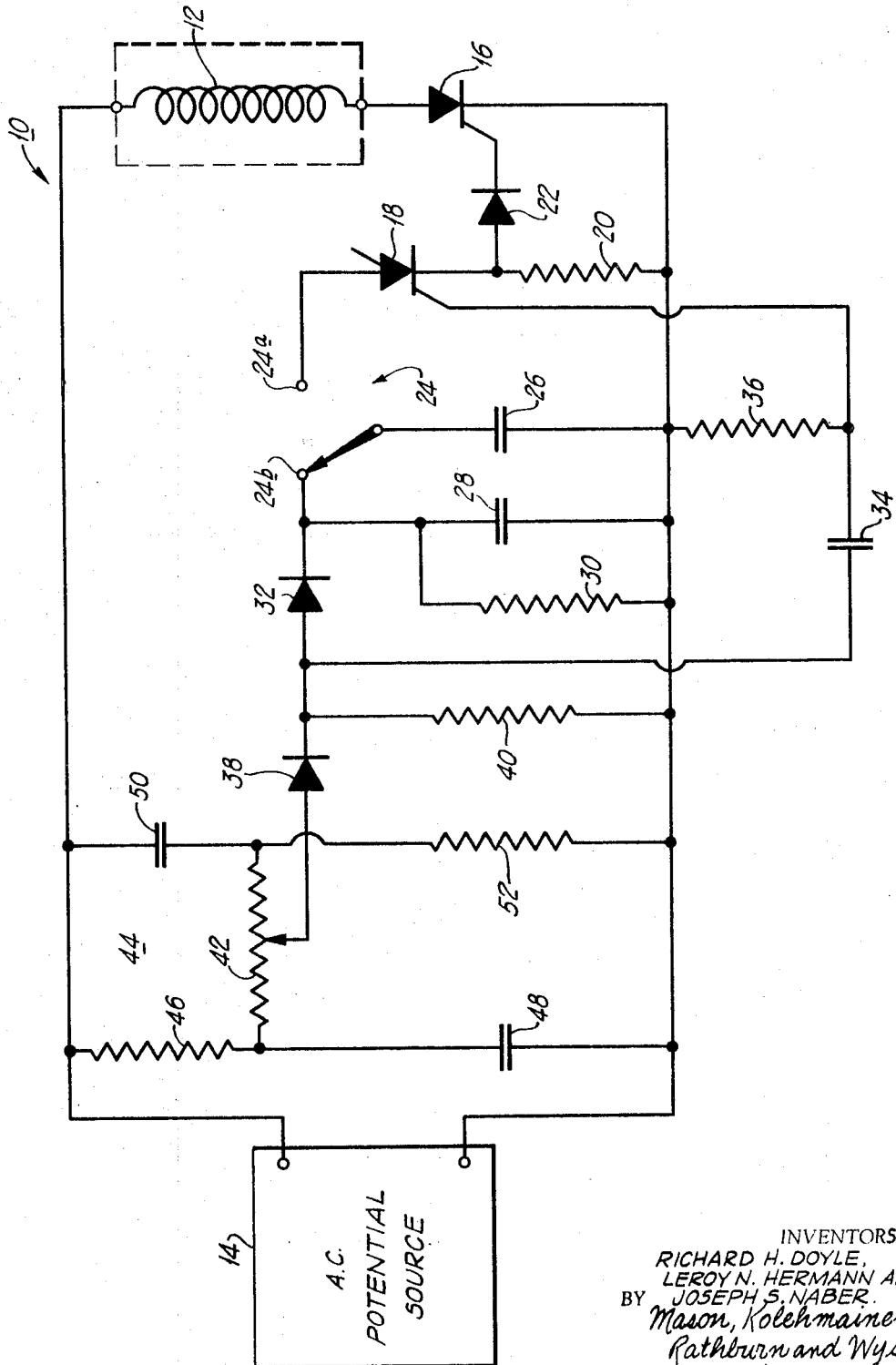

3,267,337
CONTROLLED POWER SUPPLY CIRCUIT
Richard H. Doyle, Mount Prospect, Leroy N. Hermann, St. Charles, and Joseph S. Naber, Wheeling, Ill., assignors to Fastener Corporation, Franklin Park, Ill., a corporation of Illinois
Filed Feb. 11, 1963, Ser. No. 257,677
14 Claims. (Cl. 317—148.5)

This invention relates to a circuit for controlling the energization of a load and, more particularly, to such a circuit for controlling an electrically operated fastener driving tool.

The copending application of Richard H. Doyle et al., Serial No. 161,727, filed December 22, 1961, now Patent No. 3,179,866 which application is assigned to the same assignee as the present application, discloses an electrically operated fastener driving tool that is completely self-contained in the sense that all of the driving components and the power supply therefor are carried on the housing of the tool. This tool includes a fastener driving element or blade actuated by a winding means that is selectively connected to an alternating current potential source for no more than one cycle of the potential by a manually actuated power supply or control circuit carried on the housing. During the momentary energization of the winding, the fastener driving blade is driven through a single power stroke during which the fastener or staple is driven, and the tool cannot be reoperated through an additional power stroke until the manually actutaed control means is released and reoperated. This tool is capable of continuous use without excessive heating, provides adequate driving power and is easily controlled in requiring the actuation of only a single switching means. However, to extend the reliability and operating life of the tool and to reduce cost thereof so as to enlarge its field of use, it would be desirable to provide a more easily and economically constructed control unit having a reduced number of component parts. In addition, it would be desirable to provide an easily adjusted means for controlling the output power developed by the tool.

Accordingly, one object of the present invention is to provide a new and improved circuit for controlling the energization of an electric load.

Another object is to provide a fastener driving tool using a winding means and new and improved means for controlling the periodic energization of the winding means.

A further object is to provide a simplified power supply circuit for connecting an electrical load to an alternating current potential source during a selected cycle of the alternating current potential.

Another object is to provide a simplified power supply circuit for connecting an electrical load to an alternating current potential supply which includes an energy storage means alternately connected to an energy source and a controlled conduction device.

A further object is to provide a new and improved circuit for controlling the energy supplied to the winding of a fastener driving tool.

Another object is to provide a novel output power controlling means for an electrically operated fastener driving tool which includes a phase shifting network.

In accordance with these and many other objects, an embodiment of the invention comprises a control circuit for connecting an alternating current potential source to an electrical load, such as the winding in an electrically operated fastener driving tool for no more than one cycle of the alternating current potential. This load or winding means is connected in series between the potential source and a suitable controlled conduction device, such as a silicon controlled rectifier. The gate electrode of the rectifier is coupled to the output electrode of a second controlled conduction device that supplies operating or trigger pulses to the gated rectifier when the winding is to be energized. To control the conductivity of the second controlled conduction device, the control or power supply circuit includes an energy storage means, such as a storage capacitor, that is normally connected to a charging circuit. This charging circuit supplies the capacitor with sufficient electrical energy to maintain the second controlled conduction device in a conductive condition for a period of time no longer than the duration of a single cycle of the alternating current potential.

When the tool is to be operated, a trigger actuated or workpiece engaging switch is operated to disconnect the storage capacitor from the charging circuit and to connect this capacitor to an electrode of the second controlled conduction device. The control electrode of this device is connected to the alternating current potential source through a differentiating network that provides a trigger pulse during each cycle. Thus, when the second device has been connected to the storage capacitor, which provides its sole source of energizing potential, by the manual actuation of the trigger and when a pulse is received from the differentiating network indicating that the alternating current potential is in a properly poled half cycle, the second controlled conduction device is rendered conductive to supply an operating or trigger signal to the gate electrode of the silicon controlled rectifier.

This signal places the rectifier in conduction and connects the winding directly across the potential source. The silicon controlled rectifier remains conductive during the selected half cycle of the potential and is then placed in a nonconductive condition to terminate the energization of the winding. The gated rectifier cannot be returned to a conductive condition by holding the trigger and the connected switching means in an operated position because the storage capacitor has been discharged to the point at which conduction through the second device can no longer be sustained. When the trigger is released, the storage capacitor is disconnected from the second controlled conduction device and again connected to the charging circuit so that the tool is conditioned for the next cycle of operation.

In order to control the drive of the tool or its output power, a phase shifting network is directed across the alternating current potential source. The differentiating network providing the trigger pulses for the second controlled conduction device is connected to the phase shifting network through an adjustable connection so that the phase of the signal applied to the differentiating network relative to the phase of the applied potential can be adjusted. By delaying the arrival of the trigger pulse at the control electrode of the second device, the trigger pulses supplied to the first device by the second device can be delayed until after the potential of the source has passed through a portion of the selected half cycle. Since the silicon controlled rectifier is rendered conductive following the beginning of the half cycle, the power available to the winding is reduced.

Many other objects and advantages of the present invention will become apparent from considering the following detailed description in conjunction with the drawing which provides a schematic diagram of a power supply circuit embodying the present invention.

Referring now more specifically to the drawing, therein is illustrated a load control or power supply circuit which is indicated generally as 10 and which embodies the present invention. The circuit 10 connects a load, such as a winding 12, in an electrically operated fastener tool (not shown) to an alternating current potential source 14 for all or a selected part of a single half cycle of the alternating current potential. The circuit 10, for instance, can be encapsulated or "potted" and detachably mounted in the hollow handle of the fastener driving tool in the manner described above in the above-identified application. The circuit 10 includes a set of input terminals connected to the alternating current potential source 14, such as a conventional 60 cycle, 120 volt, single phase source, and a set of output terminals which are connected to the terminals of the winding 12. The winding 12 can be carried on or mounted within a hollow forward or head portion in the housing of the tool.

Referring now more specifically to the circuit 10, this circuit includes a gated unidirectional controlled conduction device 16, such as a silicon controlled rectifier. In the illustrated circuit 10, the anode of the gated rectifier 16 is connected to one terminal of the winding 12, and the cathode of the unit 16 is directly connected to one terminal of the potential source 14, although the relative polarities of the unidirectional conducting components in the circuit 10 can be reversed, if desired. When a positive potential is applied to the anode of the gated rectifier 16 and a trigger signal is applied to the control or gate electrode thereof, the winding 12 is directly connected across the potential source 14 to develop a magnetic field for actuating the fastener driving element.

The gate electrode of the gated rectifier 16 is provided with an operating or trigger signal under the control of a second controlled conduction device 18, such as a silicon controlled switch. The cathode of the switch 18 is connected to one side of the potential source 14 through a resistance element 20 and is coupled to the control electrode of the gated rectifier 16 through a blocking diode 22. The anode of the switch 18 is connected to a pair of normally open contacts 24a on a manually actuated switch 24. The switch 24 is actuated to close the normally open contacts 24a and to open a pair of normally closed contacts 24b when the control circuit 10 is to connect the winding 12 to the potential source 14.

The normally closed contacts 24b connect an energy storing means or storage capacitor 26 to a charging circuit including a capacitor 28 that is shunted by a resistance element 30. Positive-going half cycles of the alternating current potential from the source 14 are continuously supplied through a diode 32 to charge the capacitors 26 and 28. When the tool 10 is to be operated, the switch 24 is actuated to open the contacts 24b and to close the contacts 24a. This disconnects the storage capacitor 26 from its charging circuit and connects it to the anode of the second controlled conduction device 18 so as to provide an operating potential therefor. The energy stored in the capacitor 26 is such as to maintain the device 18 in a conductive condition for a period of time no longer than one cycle of the potential supplied by the source 14.

Inasmuch as the switch 24 can be operated to prepare the device 18 and, thus, the device 16 for conduction at random times relative to the alternations in the potential supplied by the source 14, it is desirable to synchronize the periods of conduction through the device 18 with the potential supplied by the source 14 so as to insure that the potential applied across the device 16 is of a proper polarity and to insure that the rectifier is fired early enough in the cycle to permit the necessary power to be obtained. To accomplish this, one of the gate or control electrodes of the silicon controlled switch 18 is connected to a differentiating network including a capacitor 34 and a resistance element 36. The capacitor 34 is connected to the cathode of a diode 38, which cathode is also returned to one side of the potential source 14 through a resistance 40. The anode of the diode 38 is connected to an adjustable tap on a potentiometer 42 that is connected across two legs of a phase shifting network 44 which is connected across the potential source 14. The positive-going alternations in the potential supplied by the source 14 are differentiated in the network including the resistance element 36 and the capacitor 34 to provide positive-going pulses at the gate electrode of the silicon controlled switch 18.

These positive-going pulses are continuously applied to the controlled conduction device 18 so long as the circuit 10 is energized by the source 14. However, the device 18 normally is not placed in a conductive condition because of the absence of an operating potential for this device. During the first properly poled half cycle following the time at which the switch 24 is operated to close the contacts 24a, the positive-going pulse supplied to the control electrode of the device 18 places this device in a conductive state so that the storage capacitor 26 is discharged through the resistance element 20. This provides a positive-going pulse that is forwarded through the diode 22 to the gate electrode of the silicon controlled rectifier 16. Since the trigger pulse for the device 18 occurs only during positive-going alternations in the potential supplied by the source 14, the anode of the device 16 is also at a positive potential with respect to its cathode, and the trigger pulse supplied through the diode 22 places the silicon controlled rectifier 16 in a conductive condition to connect the winding directly across the potential source 14.

Since the storage capacitor 26 provides sufficient energy for maintaining the device 18 in a conductive condition for no longer than one cycle of the potential supplied by the source 14 and since the silicon controlled rectifier 16 is placed in a nonconductive condition as soon as the potential on its anode swings negative relative to its cathode, the winding 12 can be energized only once in response to the actuation of the switch 24. When the trigger or other controlling means for the switch 24 is released, the switch 24 returns to its normal position to open the contacts 24a and to close the contacts 24b. The opening of the contacts 24a disconnects the storage capacitor 26 from the anode of the silicon controlled switch 18, and the closure of the contacts 24b connects the capacitor 26 in parallel with the capacitor 28 in the charging circuit. The potential supplied by the capacitor 28 as well as that forwarded through the diode 32 rapidly recharges the storage capacitor 26 to again condition the power supply circuit 10 for controlling the next cycle of energization of the winding 12.

Since the power delivered to the winding 12 during any cycle of operation is determined by the portion of the alternating potential half cycle in which the silicon controlled rectifier 16 is in a conductive condition and since the firing of the gated rectifier 16 is dependent on the time at which the silicon controlled switch 18 is rendered conductive, the circuit 10 includes novel means for controlling the output power developed in the winding 12 by controlling the relative phase relationship between the alternating current potential supplied by the source 14 and the pulses provided by the differentiating network including the capacitor 34 and the resistance element 36. This control is exerted by the phase shift network 44 which comprises a first leg including a resistance element 46 and a capacitor 48 and a second leg including a capacitor 50 and a resistance element 52, both of which legs are connected in parallel across the potential source 14. The potentiometer 42 is connected between the two legs at the point of common connection of the elements 46, 48 and 50, 52. The network 44 shifts the phase of the alternating current potential applied to the diode 38 relative to the phase of the potential supplied by the source 14.

By adjusting the position on the tap of the potentiometer 42, the phase of the signal coupled through the diode 38 can be made to substantially coincide with the beginning of the positive-going half cycle of the potential from the source 14 so that all of the power available in the half cycle can be used by triggering the silicon controlled rectifier 16 at the beginning of the selected positive-going half cycle. Alternatively, the tap on the potentiometer 42 can be adjusted to provide a delay approaching one-half of the positive-going half cycle so that the differentiating network triggers the controlled conduction devices 16 and 18 after substantially half of the half cycle has passed. This reduces the power available for use by the winding by a factor approaching two. In this manner, the phase shift network 44 permits the power supplied by the circuit 10 to be easily adjusted without requiring the use of components connected in series between the potential source 14 and the load 12.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A control circuit for controlling the energization of a load by an undulating potential source comprising a controlled conduction device adapted to be connected in series between the load and the potential source, a signal source for applying a control signal synchronized with the undulations in the potential to the controlled conduction device to place the device in a conductive state, an energy source for energizing the signal source, said energy source normally being ineffective to supply energy to the signal source and being capable of supplying a discrete quantity of energy sufficient to render the signal source effective for a period no greater than the period between two successive undulations in the potential, and manually operable switching means operable at random times relative to the undulations in the potential source and when the load is to be energized for connecting the energy source to the signal source.

2. A control circuit for controlling the energization of a winding by an undulating potential source comprising a controlled conduction device having a control electrode and adapted to be connected in series with the potential source and the winding, a signal source for applying an operating signal to the control electrode to place the controlled conduction device in a conductive state, means for conditioning the signal source for operation in synchronism with the potential source, an energy source capable of energizing the signal source for no longer than a duration on the order of one cycle of the undulating potential, and means for rendering the energy source effective to supply energy to the signal source when the winding is to be energized.

3. A circuit for controlling the energization of a load by an undulating potential comprising a first unidirectional conducting device having a control electrode and adapted to be connected in series between the potential source and the load, a second unidirectional conducting device having a control electrode, means coupling the second device to the control electrode of the first device, storage capacitor means normally storing sufficient energy to maintain conduction through the second device for a given period of time no longer than the desired period of conduction through the first device, manually operated switch means for controlling the connection of the storage capacitor means to the second device, and a control circuit coupled to the control electrode of the second device for initiating conduction through the second device during an undulation in the potential following the connection of the storage capacitor means to the second device.

4. The circuit set forth in claim 3 in which the control circuit includes a phase shifting network energized by the potential source.

5. The circuit set forth in claim 3 including a capacitor charging circuit energized by the potential source, and in which the switch means includes means for connecting the storage capacitor means to the charging circuit.

6. A circuit for controlling the energization of a load by an alternating current potential source comprising a first controlled conduction device having a control electrode and adapted to be connected in series with the potential source and the load, a second controlled conduction device having a control electrode and a pair of output electrodes connected by conduction through the second device when the second device is placed in a conductive condition, means coupling one of the output electrodes to the control electrode of the first device, means for applying enabling signals to the control electrode of the second device in synchronism with the alternations of the potential source, and manually controlled means operated at random times relative to the alternating current potential for supplying an operating potential across the two output electrodes of the second device for a period no longer than one cycle of the alternating current potential in the interval following the operation of the manually controlled means and extending until the manually controlled means is released.

7. The circuit set forth in claim 6 including means for adjusting the relative phase relationship of the alternating current potential supplied by the potential source and the enabling signals.

8. A control circuit for controlling the energization of a winding by an alternating current potential source comprising a first controlled conduction device having a control electrode and adapted to be connected in series with the potential source and the winding, a second controlled conduction device for applying an operating signal to the control electrode, signal generating means for attempting to operate the second device to supply an operating signal to the first device during each cycle of the potential source, capacitor means, capacitor charging means, and manually operable switching means normally connecting the capacitor means to the charging means and operable to connect the capacitor means to the second device to permit the second device to supply an operating signal to the first device.

9. A circuit for controlling the energization of a load by an alternating current potential source comprising a first controlled conduction device having a control electrode and adapted to be connected in series with the potential source and the load, a second controlled conduction device having a control electrode and a pair of output electrodes connected by conduction through the second controlled conduction device when the second device is placed in a conductive condition, means coupling one of the output electrodes to the control electrode of the first device, means for applying enabling signals to the control electrode of the second device in synchronism with the alternations of the potential source, storage capacitor means, capacitor charging means energized by the potential source, and switching means operable to one condition to connect the storage capacitor means to the charging means and to another condition to connect the storage capacitor means across the output electrodes of the second device to permit limited conduction through the second device under the control of the enabling signals.

10. A circuit for controlling the energization of a load by an alternating current potential source comprising a first controlled conduction device adapted to be connected in series between the load and the potential source, a second controlled conduction device for applying an operating signal to the first device to place the first device in a conductive condition, means applying timing signals to the second device in synchronism with the alternating current potential to synchronize conduction through the second device with the alternating current potential, storage capacitor means for supplying energy to the second device to maintain the second device in conduction for a period of time no greater than the duration of a cycle of the alternating current potential, and switching means operable to render the storage capacitor means effective to discharge its energy through the second device when the second device is rendered conductive by the timing signal so that the second device supplies an operating signal to the first device, said storage capacitor means providing the sole source of potential for supporting conduction through the second device when connected to the second device by the switching means.

11. A circuit for controlling the energization of a load by an alternating current potential source comprising a first controlled conduction device having a control electrode and adapted to be connected in series between the load and the potential source, a second controlled conduction device for controlling the application of an operating signal to the control electrode of the first device, energy storage means normally supplied with energy from the potential source sufficient to maintain the second device in a conductive condition for a given period of time no longer than the desired period of conduction through the first device, control means operable to prevent the transfer of energy to the energy storage means and to condition the second device to discharge the energy from the energy storage means by conduction through the second device, said energy storage means providing the only source of energy for maintaining conduction through the second device, a control circuit coupled to the second device for maintaining conduction through the second device in synchronism with the alternating current potential, and a phase shifting network connected to the control circuit for varying the time relationship between the alternations in the potential from the potential source and the time of initiation of conduction through the second device.

12. A control circuit for supplying a single pulse of energy from an alternating current potential source to a winding comprising a gated rectifier having a gate electrode, a cathode, and an anode; circuit means connecting the winding in series with the potential source through cathode-anode path of the rectifier unit; a capacitor adapted to be placed at two different energy levels by charging and discharging currents; a manually actuated switch means operable to an actuated state at random times relative to the cycles of the alternating current potential and normally in a released state, the switch means including a common conductive means operable to alternately complete electrical circuits with first and second electrical contacts, said common conductive means normally engaging the first electrical contact; a first circuit including the first electrical contact and the common conductive means for maintaining the capacitor at a normal energy level; a unidirectional conductive device; and a second circuit including the common conductive means and the second electrical contact for connecting the unidirectional conducting device, the capacitor, the cathode, and the gate electrode in a series circuit to provide a flow of current for changing the capacitor to its other energy level and for providing a flow of gate current in the gated rectifier sufficient to cause conduction through the gated rectifier in the properly poled cycle of the alternating current potential occurring following the random actuation of the switch means, the capacitor being held substantially at its other energy level until the actuated switch means is released so that sufficient gate current to render the gated rectifier conductive during subsequent cycles cannot be provided without releasing and reoperating the switch means.

13. A control circuit for supplying a single pulse of energy from an alternating current potential source to a winding comprising a first gated rectifier having a gate electrode and a cathode, circuit means connecting the winding in series with the potential source through the rectifier unit, a capacitor adapted to be placed at two different energy levels by charging and discharging currents, a manually actuated switch means operable to an actuated state at random times relative to the cycles of the alternating current potential and normally in a released state, the switch means including a common conductive means operable to alternately complete electrical circuits with first and second electrical contacts, said common conductive means normally engaging the first electrical contact, means connecting the capacitor to the common conductive means, a first circuit including the first electrical contact for maintaining the capacitor at its normal energy level, a second gated rectifier having a gate electrode provided with a firing signal during each cycle of the alternating current potential, and a second circuit including the second electrical contact for coupling the capacitor to the second gated rectifier to change the capacitor to its other energy level, said second means also connecting the capacitor across the gate electrode and the cathode of the first gated rectifier so that the current flow incident to changing the capacitor from its normal energy level to its other energy level provides an adequate flow of gate current through the gate electrode of the first gated rectifier to place it in a conductive condition for only one properly poled half cycle of the alternating current potential occurring following the random operation of the switch means.

14. A control circuit for supplying a single pulse of energy from an alternating current potential source to a winding comprising a first gated rectifier having a gate electrode, circuit means connecting the winding in series with the potential source through the rectifier unit, a capacitor adapted to be placed at two different energy levels by charging and discharging currents, a manually actuated switch means operable to an actuated state at random times relative to the cycles of the alternating current potential and normally in a released state, the switch means including a common conductive means operable to alternately complete electrical circuits with first and second electrical contacts, said common conductive means normally engaging the first electrical contact, means connecting the capacitor to the common conductive means, a first circuit including the first electrical contact for maintaining the capacitor at its normal energy level, a second gated rectifier having a gate electrode provided with a firing signal during each cycle of the alternating current potential, and a second circuit including the second electrical contact for coupling the capacitor to its second gated rectifier to change the capacitor to its other energy level, resistance means in said second circuit in series with the capacitor across which an electric signal is developed in response to the change in the energy level of the capacitor from its normal level to its other level, and means for applying the electric signal across the resistance means to the gate electrode of the first gated rectifier to provide a single firing signal synchronized with the first complete cycle of the alternating current potential occurring following the random actuation of the switch means, the capacitor being held substantially at its other energy level until the actuated switch means is released so that sufficient gate current to render the first gated rectifier conductive during subsequent cycles cannot be provided without releasing and reoperating the switch means.

References Cited by the Examiner

UNITED STATES PATENTS

| | | | |
|---|---|---|---|
| 3,037,158 | 5/1962 | Schmidt | 321—14 |
| 3,070,739 | 12/1962 | Hansen et al. | 323—22 |
| 3,133,209 | 5/1964 | Greenwood | 307—88.5 |

JOHN F. COUCH, *Primary Examiner.*

LLOYD McCOLLUM, *Examiner.*

D. L. RAE, K. D. MOORE, *Assistant Examiners.*